US005133121A

United States Patent [19]

Birbeck et al.

[11] Patent Number: 5,133,121

[45] Date of Patent: Jul. 28, 1992

[54] STRANDED ELECTRIC CONDUCTOR MANUFACTURE

[75] Inventors: Thomas S. H. Birbeck, Maitland; Rudolf Gemert, Prescott, both of Canada

[73] Assignee: Phillips Cables Limited, Canada

[21] Appl. No.: 549,223

[22] Filed: Jul. 6, 1990

[30] Foreign Application Priority Data

Jul. 6, 1989 [GB] United Kingdom ................. 8915491

[51] Int. Cl.[5] ........................ H01R 43/00; B23P 23/00

[52] U.S. Cl. ....................................... 29/872; 29/33 F; 29/828; 174/126.1; 174/128.1

[58] Field of Search ............... 29/872, 33 F, 828, 729; 174/128.1, 126.1; 140/118, 119, 122, 149

[56] References Cited

U.S. PATENT DOCUMENTS

| | | | |
|---|---|---|---|
| 3,164,670 | 1/1965 | Ege | 174/128.1 |
| 3,760,093 | 9/1973 | Pemberton | 174/128.1 |
| 3,973,385 | 8/1976 | Roe | 174/128.1 X |
| 4,009,561 | 3/1977 | Young | 29/728 X |
| 4,436,954 | 3/1984 | Kaderjak et al. | 29/828 X |

*Primary Examiner*—Carl J. Arbes
*Attorney, Agent, or Firm*—Anthony J. Casella; Gerald E. Hespos

[57] ABSTRACT

In a method of manufacturing a stranded conductor for use in an electric power cable, the cross-sectional shapes of wires being drawn towards or through a rotatably driven lay plate by which the wires are laid helically in a layer around the axis of the conductor are so modified that, on emerging from the lay plate and passing into at least one die downstream of the lay plate, the wires of modified cross-sectional shape fit tightly together and, if present, around a central wire or a preceding layer of helically applied wires. The wires of each layer preferably are initially of the same cross-sectional shape and size as one another, e.g. approximately circular, and, preferably, the modified cross-sectional shapes imparted to the wires of each layer are the same as one another, e.g. approximating to a sector of an annulus. No compacting of the wires is required in the die or dies and, as a consequence, a capstan drawing the wires through the die or dies is not subjected to a undesirable load.

8 Claims, 2 Drawing Sheets

STRANDED ELECTRIC CONDUCTOR MANUFACTURE

In the manufacture of electric power cables comprising one or more than one cable conductor, with a view to ensuring that the cable is sufficiently flexible to enable it to be wound on and off a cable drum and to be readily installed, it is the general practice for the or each cable conductor to comprise a plurality of layers of wires or other elongate elements of metal or metal alloy, all hereinafter included in the generic term "wires", extending helically around the axis of the conductor, the lay of the wires of adjacent layers usually but not necessarily being of opposite hand. Such a cable conductor is generally, and hereinafter will be, referred to as a "stranded conductor".

When manufacturing, for use in an electric power cable, a stranded conductor of a predetermined cross-sectional area of metal or metal alloy, unless the wires of the conductor are so compacted together that a stranded conductor is obtained whose diameter is not unnecessarily large, the overall diameter of the cable will be such that an unnecessary quantity of electrically insulating material and of other materials will be required in the cable manufacture and hence the cost of the cable will be unnecessarily high.

With a view to limiting the diameter of a stranded conductor of a predetermined cross-sectional area of metal or metal alloy, during manufacture of the stranded conductor it is common practice for the partially-formed conductor and/or the wholly-formed conductor to be drawn through one or more than one die which compacts the wires of the conductor tightly together. This procedure has the serious disadvantage that the capstan drawing the conductor through the compacting die or dies is subjected to an undesirable high load.

It has also been proposed to form each layer of preformed wires of such cross-sectional shapes that, when the wires are helically laid, they fit tightly together. This proposal has the disadvantage that a plurality of wires of cross-sectional shapes and sizes differing from one another are required for any one stranded conductor, thereby substantially adding to the cost of the cable of which the conductor is to form a part.

It is an object of the present invention to provide an improved method of manufacturing a stranded conductor for use in an electric power cable by means of which the aforesaid disadvantages are avoided.

According to the invention, in the improved method of manufacturing a stranded conductor, a plurality of wires being drawn towards or passing through a lay plate or other means by which the wires are laid helically in a layer around the axis of the conductor are each caused to pass through means by which the cross-sectional shape of the wire is so modified that, on emerging from the lay plate and passing into at least one die downstream of the lay plate, the wires of modified cross-sectional shape fit tightly together and, if present, around a central wire or a preceding layer of helically applied wires.

Since the cross-sectional shapes of the wires emerging from the lay plate and entering said die or dies have been so modified that the wires will fit tightly together and, if present, around a central wire or a preceding layer of helically applied wires, no substantial compacting of the wires is effected by the die or dies and, as a consequence, the capstan drawing the wires through the die or dies is not subjected to an undesirable load.

Preferably, the cross-sectional shapes of the wires of each layer of wires of the stranded conductor are so modified that, on emerging from the lay plate and passing into said die or dies, the wires of modified cross-sectional shape of said layer fit tightly together and around a central wire or a preceding layer of helically applied wires.

The wires of the or a layer of wires being drawn towards or passing through the lay plate preferably are initially of the same cross-sectional shape and size as one another and, initially, may be of circular or non-circular cross-section.

The modified cross-sectional shapes imparted to some of the wires of the or a layer may differ from the modified cross-sectional shapes imparted to other wires of said layer but, preferably, the modified cross-sectional shapes imparted to the wires of the or a layer are substantially the same as one another. For example, in one preferred embodiment, the modified cross-sectional shapes imparted to the wires of the or a layer each approximates to a sector of an annulus.

The invention also includes improved apparatus for use in the improved method of manufacturing a stranded conductor as hereinbefore described, which improved apparatus comprises a lay plate or other means by which a plurality of wires travelling in the directions of their lengths can be laid helically in a layer around the axis of the conductor, at least one die disposed downstream of the lay plate for assembling the wires together and, disposed upstream of or on the lay plate. shaping means by which the cross-sectional shape of each wire can be so modified that, on emerging from the lay plate and passing through said die or dies, the wires of modified cross-sectional shape will fit tightly together.

The shaping means by which the cross-sectional shape of each wire of the or a layer is modified may take any convenient form. In one preferred embodiment in which the shaping means are disposed upstream of the lay plate, each shaping means comprises a pair of freely rotatable rollers between which a wire is drawn, one or each roller being urged transversely towards the other roller and the circumferential surfaces of the rollers co-operating to define the cross-sectional shape into which the cross-section of the wire is to be modified. In a second preferred embodiment in which the shaping means are disposed on the lay plate, each shaping means comprises a bore extending through the lay plate, the cross-sectional shape of which bore over at least a part of its length changing smoothly and continuously from a substantially circular cross sectional shape at the upstream end of said part of said length to the required modified cross-sectional shape at the downstream end of said part of said length, the cross-sectional area of the bore over said part of said length being substantially constant.

The invention is further illustrated by a description, by way of example, of a stranded electric conductor for use in an electric power cable, which conductor can be manufactured by the improved method of the invention, and of two preferred methods of and apparatus for forming one layer of wires of the stranded conductor, with reference to the accompanying drawings, in which.

Figure 1:
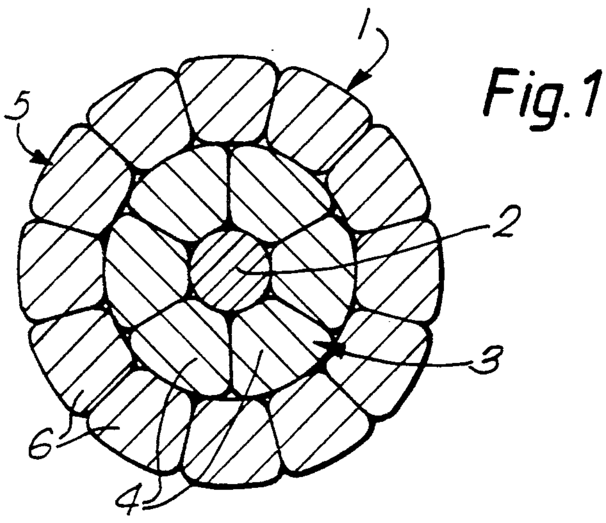
FIG. 1 is a transverse cross-sectional view of the stranded conductor.

The stranded conductor 1 shown in FIG. 1 comprises a central copper wire 2 of circular cross-section, an inner layer 3 of copper wires 4 each of a cross-section approximating to a sector of an annulus extending helically around the central copper wire, and an outer layer 5 of copper wires 6 each of another cross-section approximating to a sector of an annulus extending helically around the layer 3 with a direction of lay opposite to that of the wires 4 of layer 3.

Figure 2:
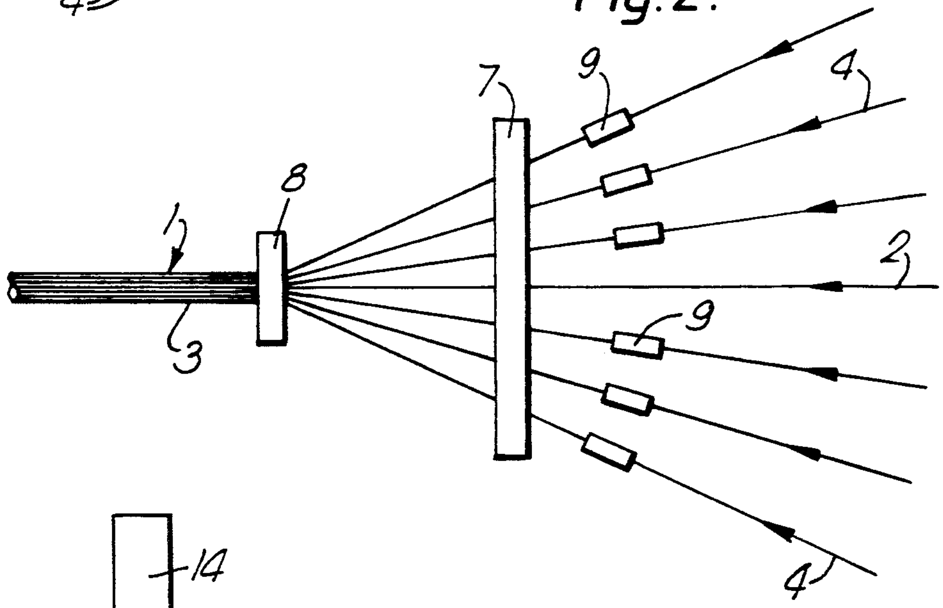
FIG. 2 is a fragmental diagrammatic side view of the apparatus employed in one preferred method of forming one layer of wires of the stranded conductor shown in FIG. 1.
Figure 3:
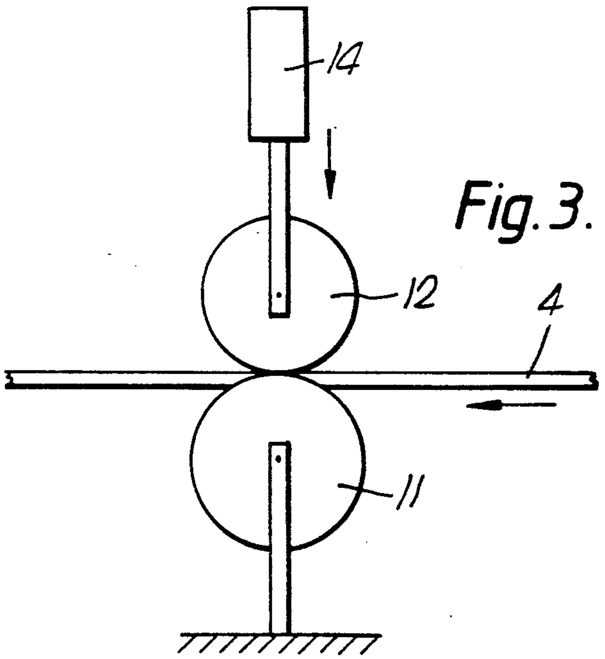
FIG. 3 is a diagrammatic side view of one shaping means of the apparatus shown in FIG. 2.

Referring to FIGS. 2 and 3, when forming the inner layer 3 of copper wires 4 of the stranded conductor shown in FIG. 1 by the first preferred method, the central copper wire 2 is drawn along the axis of the stranded conductor to be formed through the center of a lay plate 7 rotating about the axis of the conductor and into a die 8 downstream of the lay plate. At the same time, six copper wires 4, each initially of the same approximately circular cross-section, are drawn through shaping means 9, one for each wire, upstream of the rotating lay plate 7 and through the lay plate into the die 8. As will be seen on referring to FIG. 3, each shaping means 9 comprises a pair of freely rotatable rollers 11 and 12, the roller 11 being fixed in space and the roller 12 being urged transversely towards the roller 11 by means of a hydraulically or pneumatically operated piston 14. The circumferential surfaces of the rollers 11 and 12 co-operate to define the cross-sectional shape of a sector of an annulus in accordance with each wire 4 as shown in FIG. 1. At each shaping means 9, the cross-sectional shape of the wire 4 passing therethrough is modified to a cross-sectional shape approximating to said sector of an annulus. At the rotating lay plate 7, the sector-shaped wires 4 are laid helically around the advancing central copper wire 2 and, at the die 8, the helically extending sector shaped wires are caused to fit tightly together to form the layer 3 of approximately circular overall cross-section.

Since no substantial compacting of the wires 4 is effected by the die 8, the capstan (not shown) drawing the wires through the die is not subjected to an undesirable load.

Figure 4:
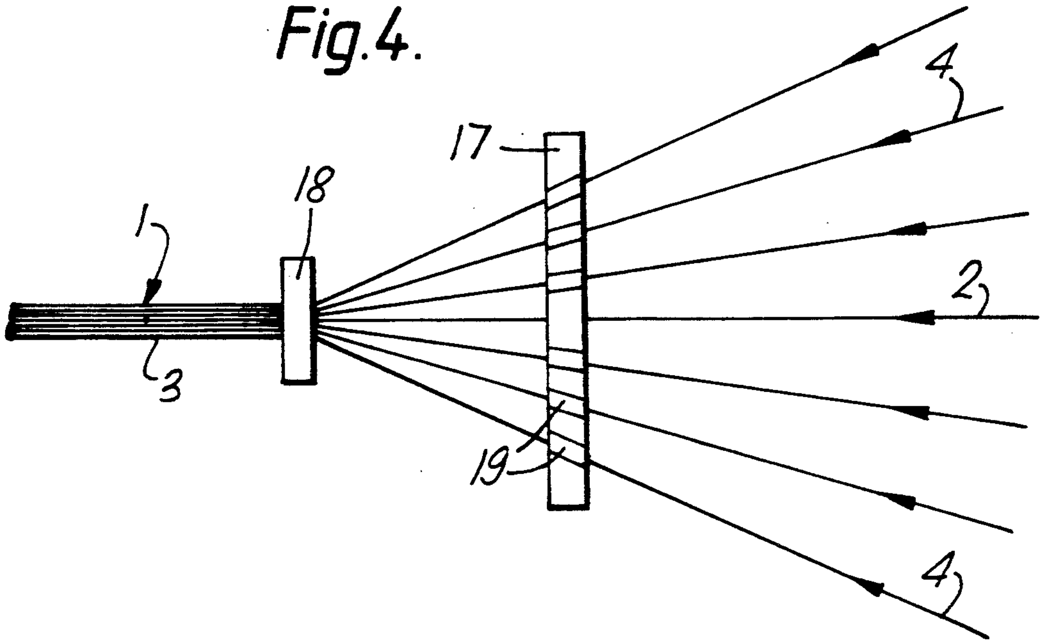
FIG. 4 is a fragmental diagrammatic side view of the apparatus employed in a second preferred method of forming one layer of wires of the stranded conductor shown in FIG. 1.
Figure 5:
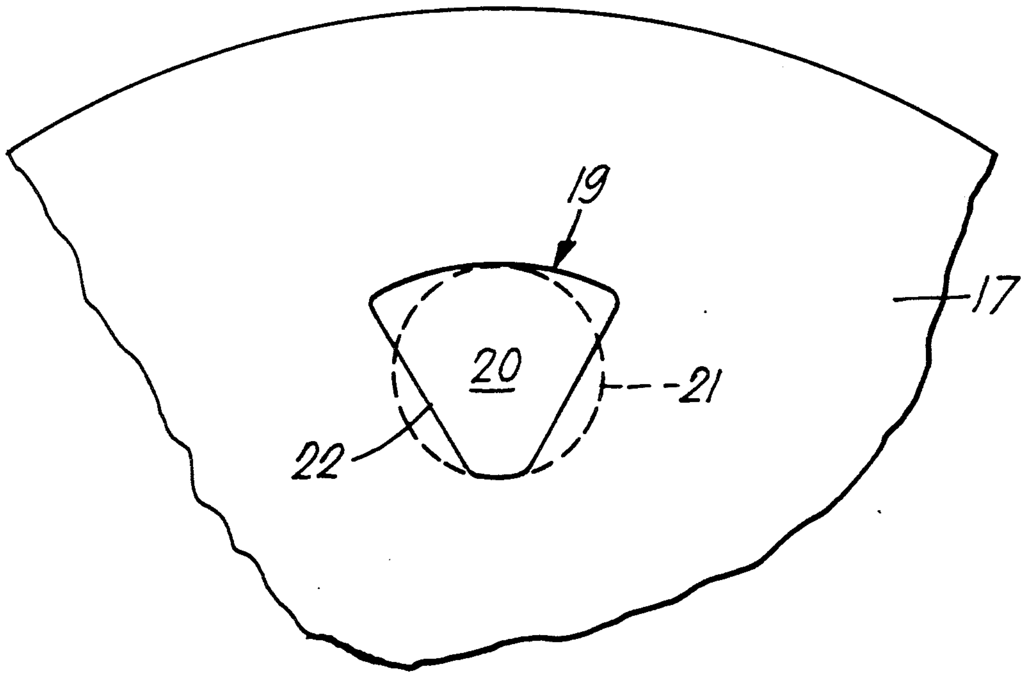
FIG. 5 is a diagrammatic view of the downstream end of one shaping means of the apparatus shown in FIG. 4.

Referring to FIGS. 4 and 5, when forming the inner layer 3 of copper wires 4 of the stranded conductor shown in FIG. 1 by the second preferred method, the central copper wire 2 is drawn along the axis of the stranded conductor to be formed through the center of a lay plate 17 rotating about the axis of the conductor and into a die 18 downstream of the lay plate. At the same time, six copper wires 4, each initially of the same approximately circular cross-section, are drawn through shaping means 19 disposed on the rotating lay plate 17, one shaping means for each wire, and beyond the lay plate into the die 18. As will be seen on referring to FIG. 5, each shaping means 19 comprises a bore 20 extending through the lay plate 17, the cross-sectional shape of which bore over a part of its length changing smoothly and continuously from a substantially circular cross-sectional shape 21 at the upstream end of said part of said length to a cross-sectional shape 22 at the downstream end of said part of said length approximating to a sector of an annulus in accordance with each wire 4 as shown in FIG. 1. The cross-sectional area of the bore 20 over said part of its length is substantially constant. At each shaping means 19, the cross-sectional shape of the wire 4 passing therethrough is modified to the cross-sectional shape 22 approximating to a sector of an annulus and the sector-shaped wires are wound helically around the advancing central copper wire 2. At the die 18, the helically extending sector shaped wires 4 are caused to fit tightly together and around the central copper wire 2 to form the layer 3 of approximately circular overall cross-section.

As in the case of the first preferred method described with reference to FIGS. 2 and 3, since no substantial compacting of the wires 4 is effected by the die 18, the capstan (not shown) drawing the wires through the die is not subjected to an undesirable load.

What we claim as our invention is:

1. A method of making a stranded conductor for use in an electric power cable, said stranded conductor having a longitudinal axis, said method comprising the steps of:

providing a central wire and a plurality of outer wires;

advancing the central wire in the axial direction of the stranded conductor;

advancing the plurality of outer wires in the direction of advance of the central wires;

modifying each of the plurality of advancing outer wires into a selected non-circular cross-sectional shape;

applying the plurality of modified outer wires helically around the advancing central wire to form at least one layer of outer wires around the central wire; and fitting the helically applied modified outer wires tightly together around the central wire.

2. A method as claimed in claim 1 in which the stranded conductor comprises at least two layers of helically applied wires, wherein the step of modifying the cross-sectional shapes of the outer wires comprises modifying the wires of each layer so that the wires of modified cross-sectional shape of each said layer fit tightly together.

3. A method as claimed in claim 1 wherein the step of providing a central wire and a plurality of outer wires comprises providing outer wires that are initially of the same cross-sectional shape and size as one another.

4. A method as claimed in claim 1, wherein the step of modifying the cross-sectional shapes of the wires of said layer of wires comprises modifying the wires in said layer into cross-sectional shapes substantially the same as one another.

5. A method as claimed in claim 1, wherein the step of providing a plurality of outer wires comprises providing outer wires that are initially of the same substantially circular cross-sectional shape and size as one another and wherein the step of modifying the cross-sectional shapes of the outer wires comprises modifying each said outer wire to approximate a sector of an annulus.

6. Apparatus for manufacturing a stranded conductor for use in an electric power cable, said apparatus comprising:

drawing means for drawing a central wire and a plurality of outer wires from supplies thereof in respective directions of the lengths of said wires;

shaping means disposed upstream of said drawing means an downstream of the supplies of the outer wires for modifying the cross-sectional shape of each of the advancing outer wires;

wire applying means disposed upstream of said drawing means and downstream from said shaping means, said wire applying means being rotatable about an axis substantially co-axial with the central wire so that it will apply the plurality of advancing outer wires of said modified cross-sectional shapes helically about the central wire; and die means disposed between said wire applying means and said drawing means for fitting the helically applied outer wires of said modified cross-sectional shapes tightly together around the central wire, the cross-sectional shapes into which the advancing outer wires will be modified by said shaping means being such that the modified outer wires will be tightly fitted together around the central wire by said die means.

7. Apparatus as claimed in claim 6 wherein the wire applying means comprises a lay plate, the shaping means is disposed upstream of and spaced from the lay plate and comprises, for each outer wire, a pair of freely rotatable rollers between which an outer wire is drawn, at least one of said rollers in each said pair being urged toward the other roller in the pair and circumferential surfaces of the rollers cooperating to define the cross-sectional shape into which the cross-section of an outer wire is to be modified.

8. Apparatus for manufacturing a stranded conductor for use in an electric power cable, said apparatus comprising:

drawing means for drawing central wire and a plurality of outer wires from supplies thereof in respective directions of the lengths of said wires;

wire-applying means disposed upstream of said drawing means and downstream from the supplies of the outer wires, said wire-applying means being rotatable about an axis substantially coaxial with the advancing central wire so that it can apply the plurality of advancing outer wires helically about the central wire;

shaping means disposed on the wire applying means for modifying the cross-sectional shape of each of the advancing outer wires as it passes through the wire applying means and is applied helically about the central wire; and die means disposed between said wire applying means and said drawing means for fitting the helically applied outer wires of said modified cross-sectional shapes tightly together around the central wire, the cross-sectional shapes into which the advancing outer wires will be modified by said shaping means being such that the modified outer wires will be tightly fitted together around the central wire by said die means.

* * * * *